Sept. 12, 1950  J. W. KNOWLTON ET AL  2,522,046
MOLD FOR FURNACES
Filed Jan. 25, 1946

Inventors
GUY H. FETTERLEY
JAMES W. KNOWLTON
By George Crompton
Attorney

Patented Sept. 12, 1950

2,522,046

UNITED STATES PATENT OFFICE 2,522,046

MOLD FOR FURNACES

James W. Knowlton, Worcester, Mass., and Guy H. Fetterley, Chippawa, Ontario, Canada, assignors to Norton Company, Worcester, Mass., a corporation of Massachusetts Application January 25, 1946, Serial No. 643,248

5 Claims. (Cl. 18—47)

1

The invention relates to the molding of refractory material, under heat and pressure, and with regard to its more specific features, to the molding of boron carbide articles from powders thereof.

An object of the invention is to provide an apparatus for the manufacture of liners for sandblast nozzles. Another object of the invention is to provide a mold by the use of which the number of rejected pieces molded in a furnace, for example of the type disclosed in U. S. Letters Patent No. 2,125,588, will be greatly reduced. Other objects will be in part obvious or in part pointed out hereinafter.

The invention accordingly consists in the features of construction, combinations of elements, arrangements of parts, and in the several steps and relation and order of each of said steps to one or more of the others thereof, all as will be illustratively described herein, and the scope of the application of which will be indicated in the following claims.

Figure 1:
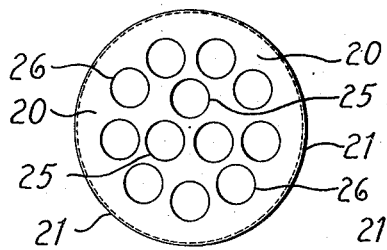
Figure 2:
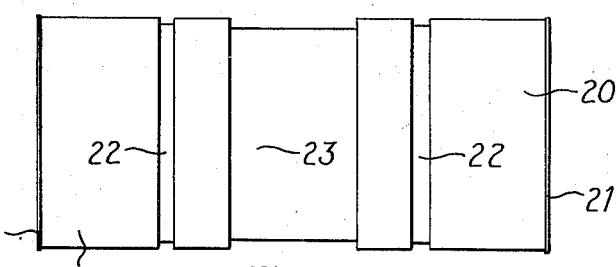
Figure 3:
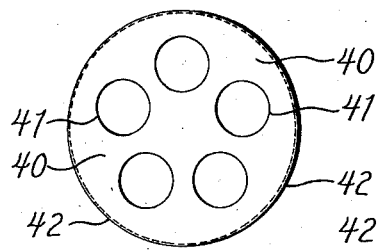
Figure 4:
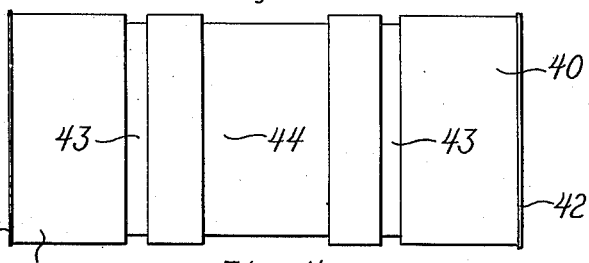
Figure 5:
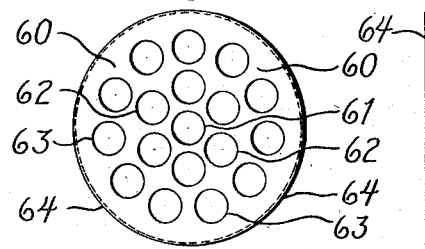
Figure 6:
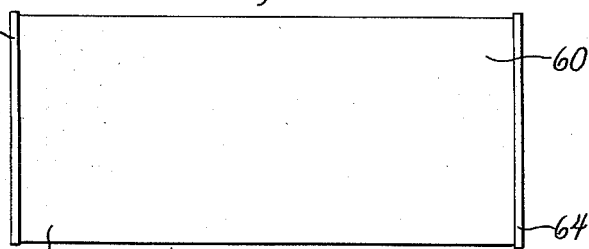
Figure 7:
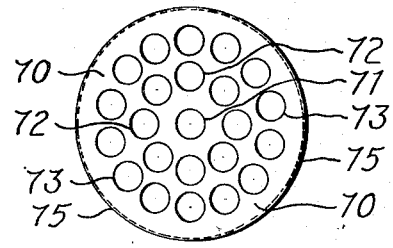
Figure 8:
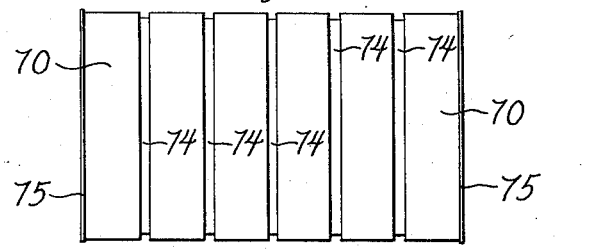
Figure 9:
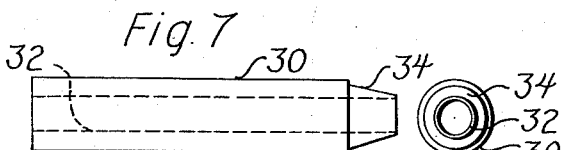
Figure 10:
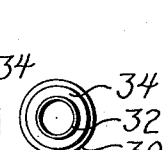
Figure 11:
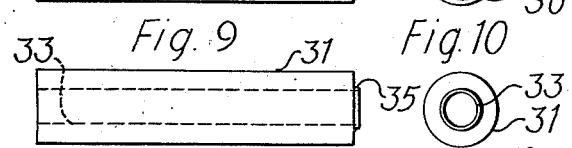
Figure 12:
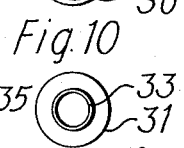

In the accompanying drawings illustrating a number of specific molds constructed in accordance with the invention and which may be used to carry out the process of the invention, Figure 1 is an end view of a mold;
Figure 2 is a side view of the mold of Figure 1;
Figure 3 is an end view of a mold;
Figure 4 is a side view of the mold of Figure 3;
Figure 5 is an end view of a mold;
Figure 6 is a side view of the mold of Figure 5;
Figure 7 is an end view of a mold;
Figure 8 is a side view of the mold of Figure 7;
Figure 9 is a side view of a plunger to form the entrance end of a nozzle;
Figure 10 is an end view of the plunger of Figure 9;
Figure 11 is a side view of a plunger to form the exit end of a nozzle;
Figure 12 is an end view of the plunger of Figure 11.

The various molds illustrated in the drawings and many others which can be made in accordance with this invention are adapted for use in a pressure molding apparatus such as is described in the patent to Ridgway, No. 2,125,588. Accordingly, for a full understanding of the present invention, reference should be made to that patent which is fully descriptive of high temperature pressure molding of boron carbide. Reference should also be made to patent to Ridgway, No. 2,150,884 which describes thermal-pressure molding in the same apparatus as illustrated in Patent No. 2,125,588 but in multiple-chambered graphite molds. In accordance with the present invention, much longer pieces of molded boron carbide can be made than was possible with the molds shown and described in the above patents and in accordance with the present invention other improvements are achieved such as are indicated in the objects of the invention.

Molded boron carbide of the general formula $B_4C$ made, for example, in accordance with patent to Raymond R. Ridgway, No. 1,897,214 has been found to be particularly useful for sandblasting liners. Sandblasting is a generic name for abrasive operations involving the propelling by gaseous pressure of hard abrasive material such as fused alumina, silicon carbide, quartz in granular form and steel shot or grit. Naturally enough the nozzles from which the abrasive is ejected are subjected to severe abrasion. These nozzles for sandblasting machines used to be made of steel; however, the life of a nozzle was very short. It was found that the use of a liner of boron carbide immeasurably prolonged the life of the nozzles. Such liners could be and were made with the apparatus of Patents Nos. 2,125,588 and 2,150,884 but the limitations thereof prevented the molding of long liners except with excessive rejections. In fact, some liners could not be made at all in such apparatus. The users of sandblast equipment have desired long liners and were not satisfied with two or more short ones mechanically held together.

Referring now to Figures 1 and 2, the mold 20 is adapted for the manufacture of a boron carbide liner 6 inches long with an outside diameter of $\frac{7}{8}$ inch and a bore of $\frac{3}{8}$ inch. The liner will have an entrance cone of 25 degrees included angle with an entrance cone diameter of .71 inch.

The mold 20 has a main diameter of $5\frac{1}{8}$ inches with integral annular end flanges 21 of an additional $\frac{1}{16}$ inch in diameter, i. e. of $5\frac{3}{16}$ inches in diameter.

The mold 20 has a pair of annular grooves 22, $\frac{1}{8}$ inch in depth and $\frac{3}{8}$ inch in width, the center lines of which are situated 3 inches from the ends of the mold. It further has a wide centrally located groove 23, $\frac{3}{16}$ inch in depth and 3 inches long. As will be readily seen from Figure 2, the flanges 21, the grooves 22 and the wide groove 23 form breaks on the otherwise smooth cylindrical surface of the mold 20.

Referring to Figure 1, the mold 20 has three bores 25 and nine bores 26, all of them $\frac{7}{8}$ inch in diameter and all of them parallel to the geometric axis of the mold. The three bores 25 are spaced equi-distant on a circle whose center is the center of the mold and whose diameter is $1\frac{5}{16}$ inches. The nine bores 26 are spaced equi-distant on a circle whose center is also the center of the mold and whose diameter is $3\frac{3}{8}$ inches. One of the bores 25 has an angular position midway between two of the bores 26. This description accurately locates every bore in the mold body 20.

Referring now to Figures 9, 10, 11 and 12, we provide mold plungers 30 and 31. There should be as many plungers 30 as there are total bores 25 and 26 and likewise an equal number of plungers 31. We first place a set of plungers (either 30 or 31) in one end of the mold 20; that is to say, in the bores thereof, inserting them equal distances into the bores but allowing for further movement to compact the boron carbide powder. However, before inserting a set of plungers in the bores 25 and 26, we place a set of core rods, not shown, in the plungers. The plungers 30 have bores 32 of ⅜ inch and the plungers 31 have bores 33 likewise of ⅜ inch in diameter. The core rods are true cylindrical pieces and are inserted in the bores 32 or 33 to equal distances. The plungers 30 have conical ends 34 which form, in the finished liners, entrance cones. Likewise the plungers 31 have projections 35 of negative toric shape which form in the finished liners exit end flared mouths of toric shape. The core rods project to equal distances beyond the projections 34 or 35 and when the plungers 30 have been inserted in the bores 25 and 26 of the mold body 20, the core rods are thereby located in said bores and it is desirable that all of them be approximately centrally located, axially, in the mold body 20.

Then the assembly is placed in a vertical position. Now the spaces between the centrally located core rods and the cylindrical walls of the bores 25 and 26 are filled with equal and measured amounts of powder, sufficient to form the desired length (6 inches) of the liners.

Within the scope of the present invention, any refractory powder which can be sintered under heat and pressure may be used. This includes all of the refractory metals, alloys, and mixtures of metals. For example, iron powders mixed with graphite with or without one or more of steel-forming elements such as Mn, Va, Ni, Cr and Mo may be molded in the molds and according to the method of the present invention. Also, certain refractory oxides can be molded under heat and pressure, such as beryllia BeO. Other substances which can be pressure molded according to the invention are titanium carbide alone or mixed with iron, cobalt or nickel, titanium nitride alone or mixed with iron, cobalt or nickel, or titanium carbide or nitride with a refractory oxide such as beryl and many other compositions. The molds of the invention are made of carbonaceous material, preferably graphite. Graphite will reduce many oxides at sintering temperatures. However, besides beryllia, other oxides which are not easily reduced may be molded in accordance with this invention, such as $Al_2O_3$, $ThO_2$, and $TiO_2$.

Furthermore, the invention is particularly intended for use in manufacturing sintered molded bodies out of the hard carbides including tungsten carbide, titanium carbide, vanadium carbide, and more especially boron carbide. While a boron-rich boron carbide may in some cases be preferred, we have actually in most cases used boron carbide powder of approximately the following formula:

| | Per cent |
|---|---|
| B | 77.3 |
| C | 21.6 |
| Fe | 0.03 |

Remainder undetermined.

With regard to particle size, various particle sizes may be used for particular results but for molding boron carbide articles which are strong and dense we have had good results using powders of approximately the following particle size:

| Microns: | Percentage by weight |
|---|---|
| 35–50 | 1 |
| 25–35 | 2 |
| 15–25 | 4 |
| 7–15 | 25 |
| 3–7 | 50 |
| 1–3 | 15 |
| Finer than 1 | 3 |

The next step is to insert the remaining plungers, either 30 or 31, into the bores 25 and 26 at the upper end of the mold, with the projections 34 or 35 in the mold and the bores 32 or 33 containing the ends of the core rods. The mold is then put in a hand press and the upper plungers are forced into alignment and against the molding powder. The entire assembly is then placed in the graphite tube 50 of Ridgway Patent No. 2,125,588, suitable graphite spacers such as the spacers 173 of said patent are then inserted, the plungers 136 of said patent are inserted in the graphite tube 50 against the spacers, the graphite tube is heated by electric current, pressure is applied through the plungers 136 of the above Ridgway patent and thus after a time interval a dozen liners are formed by sintering under heat and pressure. The sintering temperature in the case of boron carbide is just short of the fusing point of that material and for a full disclosure thereof and of the molding technique including the pressure required, reference may be had to an earlier Ridgway Patent No. 2,077,786 wherein it is stated that boron carbide has a melting point of about 2400° C. plus or minus 50° C. or probably 2375° C. as measured by optical methods. We prefer to use a pressure of 2500 pounds per square inch, for the reason that use of a standard pressure simplifies calculations and this pressure has been found to be satisfactory for all practical problems encountered. Actually in carrying out the process of this invention, the temperature is raised gradually but the determination of when the article is finished and the heat may be cut off is made by observation of the plungers, for at the critical temperature the movable plunger of the mold will suddenly move inwardly, whereupon the temperature is kept constant for a few more minutes and then the heating circuit is opened. The pressure however, is maintained until the mold has cooled. A safe temperature at which to reduce the pressure is 500° C.

It remains only to remove the mold from the furnace after the furnace has cooled, to break up the graphite mold and if necessary the graphite plungers, and remove the finished pieces. They will be found to be 6 inch boron carbide liners of the dimensions previously specified, of great hardness, good uniform density within commercial limits, and have long life when used as liners in sandblasting nozzles.

With the new molding technique according to this invention, we can make solid cylinders eleven times as long as their diameter, or cylinders with bores in which the length of the cylinder is twenty-four times the wall thickness. Previously the limit of length for solid cylinders was less than five times the diameter, and for cylinders with bores was less than ten times the wall thickness. It is now possible according to the method and using the molds of this invention to make boron carbide articles with an ultimate diameter of 4⅜ inches, whereas previously the limit was about 3 inches when using the graphite furnace tubes that are available, which tubes have the following dimensions: 64 inches long x 6½ inches outside diameter x 5¼ inches inside diameter. In this connection it will be noted that the diameter of the end flanges 21 is 5 5/16 inches so there is a clearance of 1/16 inch on the diameter between these flanges and the furnace tube.

The mold design hereof is successful for the production of long pieces for the following reasons: Graphite, which is not isotropic in strength, is actually stronger at temperatures ranging around 2270° C., than it is at room temperatures, for example, around 20° C. This is very surprising and we do not know of any other material having such characteristics. Of course, most materials have long ceased to be solid at the temperature of 2270° C. but we can measure the tensile strength of metals at a range of temperatures and without exception find that when they are red hot they are weaker than when they are cold. Understanding that no two pieces of graphite would be exactly alike, the following table gives an indication of the increase of strength of graphite:

*Breaking strength of graphite in pounds per square inch*

|  | 20° C. | 1500° C. | 2270° C. |
|---|---|---|---|
| Nine pieces cut | 3,860 | 4,770 | 8,500 |
| Parallel to Axis | 3,864 | 4,730 | 7,590 |
| From the Same Block | 4,040 | 4,475 | 8,610 |
| Six pieces cut | 2,410 | Not determined | 2,720 |
| Perpendicular to Axis | 1,860 | do | 4,360 |
| From the Same Block | 1,000 | do | 3,920 |

The second consideration is that boron carbide particles do not act according to Pascal's law. It is doubted if any particles act exactly according to Pascal's law but molding material useful according to the present invention does not respond very closely to Pascal's law. This means that the pressure may be 2500 pounds per square inch at the entrance cones 34, and exit mouths 35 of the plungers 30 and 31 but it is a good deal less at the center of the mold.

The next fact that makes the present invention work is that graphite is plastic at high temperatures, whereas it is brittle at low temperatures. This fact does not seem reconcilable with its apparently greater strength at high temperatures but it is a fact none the less because mistakes and accidents in molding have produced bent and twisted pieces of graphite.

The next fact that makes the present invention successful is that while graphite probably does not weld to itself very readily, it does weld to boron carbide, at least to an appreciable degree. It is now explained why some of our pieces of boron carbide were fractured in earlier experience. The boron carbide had welded to the mold wall, the mold wall was so thick that despite plasticity it would not give, and differential contraction upon cooling shattered the boron carbide. The present molds have such thin walls, and especially inside of the annular grooves 22 and 23, that the graphite will deform before the boron carbide will fracture. Another reason for the groove 23 is to heat up the central part of the mold cavity, i. e. the boron carbide contained therein, as much as or even more than the end parts of the cavity because it is the central part of the cavity where the pressure is least.

Referring now to Figures 3 and 4, for the manufacture of a liner 6 inches long, 1¼ inches outside diameter, with a bore of 7/8 inch, we use the mold body 40 of these figures. This mold body 40 has five bores 41 which are spaced at equal distances around a circle 2⅞ inches in diameter, these bores being 1¼ inches in diameter. Referring to Figure 4, this mold body 40 has a principal diameter of 5⅛ inches with end flanges 42, 5 3/16 inches in diameter, these figures being the same as for mold body 20. It is 12 inches long and has a pair of grooves 43 the centers of which are 3 inches from the ends of the mold, and which grooves are 3/16 inch deep and ½ inch in width. It likewise has a central groove 44 which is 3/16 inch in depth and 3 inches wide. The foregoing is a complete description of this mold which, of course, is made of graphite. For this mold 40 we use plungers of generally the same appearance as the plungers 30 and 31 but, of course, the inside and outside diameters are different and so are the sizes of the cones for the entrance ends of the liners and negative tores for the exit end of the liners, all as will be well understood to those skilled in the art. This mold is filled as already described and the simultaneous heating and pressing are carried out as already described.

Referring now to Figures 5 and 6, a graphite mold 60 is shown as having eighteen cylindrical bores, ¾ inch in diameter, one bore 61 being coaxial with the mold, six bores 62 being spaced equi-distant on a circle 1⅞ inches in diameter and eleven bores 63 being spaced equi-distant on a circle 3¾ inches in diameter. When it is added that one of the inner row of six is radially aligned with one bore of the outer row of eleven, we have a complete description of the arrangement of the bores.

This mold, like all the others, has a principal diameter of 5⅛ inches which is in fact unbroken save at the ends where there are flanges 64, 3/16 inch wide and projecting upwardly 3/32 inch which is the same as saying that these flanges have diameters of 5 3/16 inches. The plungers for this mold are shaped like the plungers 30 and 31 but are of sizes to fit the bores in the mold and to form, with the use of core rods, the required bores in the liners. This mold is filled and used as are the others. There are thereby produced eighteen liners with outside diameters ¾ inch, 4 inches long, and desired bores which in a typical case were ¼ inch. In this case these liners had an entrance cone with an included angle of 31 degrees and a maximum diameter of .59 inch.

For the manufacture of liners 4 inches long with an outside diameter ⅝ inch, we use the mold shown in Figures 7 and 8. This graphite mold 70 has twenty-three bores, each ⅝ inch in diameter, one bore 71 being axially located, eight bores 72 being spaced as the cardinal and intercardinal points of the compass on a coaxial circle 2 5/32 inches in diameter, and the remainder of the bores 73 being spaced equi-distant on a coaxial circle 3⅞ inches in diameter, two bores 73 of the outer circle being in line with two bores 72 of the inner circle. This mold 70 is 9 inches long, has grooves 74 each ¼ inch wide and 5/32 inch deep spaced from each other and from the ends of the mold 1½ inches. It likewise has flanges 75 at the ends, of the same size as the flanges 21 and 42. Like the others, it is 5⅛ inches in principal diameter. It is fitted with mold plungers similar to the plungers 30 and 31 and, as in previous cases, the bores of the liners produced in this mold will be the same as the diameters of the core rods which fit with a sliding fit in the bores of the plungers.

In the mold 20 of Figures 1 and 2 the ratio (hereinafter called A) of the thickness of the thinnest portion of the wall of graphite between an outer bore 26 and the cylindrical surface of the mold to the diameter of the bores 26 is .50. In the same mold 20 the ratio (hereinafter called B) of the thinnest portion of the wall of graphite between bores to the diameter of the bores is .30. In the case of the mold 40, ratio A is .40 and ratio B is .35. In mold 60 ratio A is .46 and ratio B is .375. In mold 70 ratio A is .55 and ratio B is .35. The range of ratio A is thus from .40 to .55. The range of ratio B is from .30 to .375. However, a set of molds for the manufacture of a long piece of refractory material of the nature described may have a ratio A of from 0.35 to 0.65 and a ratio B of from .25 to .45. In all of the above figures the wall of graphite between an outer bore and the cylindrical surface of the mold is measured from the major surface of the mold, disregarding the flanges 21, 42, 64 and 75, and disregarding the grooves 22, 23, 43, 44 and 74.

It is now believed that the reason why better results are obtained with molds with thin walls, especially for the manufacture of long pieces of boron carbide or other material, is that the graphite if thin, flexes during the cooling, and thus does not fracture the molded pieces. Graphite is the only satisfactory material for molding at high temperatures, of which we are aware. Graphite has a low coefficient of expansion, usually considered to be from $12 \times 10^{-7}$ to $22 \times 10^{-7}$ per degree centigrade. Materials that are molded according to this invention have higher coefficients, some of them much higher. Furthermore, boron carbide and most of the other materials stick to the graphite probably because the graphite is porous. If the graphite does not give, something has to break and with the temperature involved the carbide breaks first. It is especially important to have a thin mold section outside the entrance end cones and the exit end mouths, which are made by the portions 34 and 35 of the plungers 30 and 21. Consequently the molds are made thin in the center, where the pressure is least, by providing the grooves 23 and 44 and the central grooves 74, and are made thin over the portions 34 and 35 by the grooves 22, 43 and the outer grooves 74. All of the grooves also help to transmit heat into the boron carbide.

In giving the foregoing theories as to reasons for the benefits obtained by using molds according to the invention, we do not want to be bound thereby and furthermore the phenomena involved were not understood prior to making of the present invention.

It will thus be seen that there has been provided by this invention an article, an apparatus and a method in which the various objects hereinabove set forth together with many thoroughly practical advantages are successfully achieved.

As various possible embodiments might be made of the mechanical features of the above invention and as the art herein described might be varied in various parts, all without departing from the scope of the invention, it is to be understood that all matter hereinbefore set forth, or shown in the accompanying drawings, is to be interpreted as illustrative and not in a limiting sense.

We claim:

1. A mold for a furnace for molding under heat and pressure consisting of a cylindrical graphite body with bores parallel to the axis of said body, the ratio of the thickness of the thinnest portion of the outer wall of graphite between an outer bore and the cylindrical surface of the mold to the diameter of said outer bore being from .35 to .65, and the ratio of the thinnest portion of the wall of graphite between bores to the diameter of one of said bores being from .25 to .45.

2. A mold for a furnace for molding under heat and pressure consisting of a cylindrical graphite body with bores parallel to the axis of said body, the ratio of the thickness of the thinnest portion of the outer wall of graphite between an outer bore and the cylindrical surface of the mold to the diameter of said outer bore being from .35 to .65.

3. A mold for a furnace for molding under heat and pressure consisting of a cylindrical graphite body with bores parallel to the axis of said body, the ratio of the thinnest portion of the wall of graphite between bores to the diameter of one of said bores being from .25 to .45.

4. A mold for a furnace for molding under heat and pressure consisting of a cylindrical graphite body with bores parallel to the axis of said body and having grooves in its cylindrical surface to weaken said body thereat.

5. A mold for a furnace for molding under heat and pressure consisting of a cylindrical graphite body with bores parallel to the axis of said body and having a wide groove in its cylindrical surface for heat transfer.

JAMES W. KNOWLTON.
GUY H. FETTERLEY.

REFERENCES CITED

The following references are of record in the file of this patent:

UNITED STATES PATENTS

| Number | Name | Date |
| --- | --- | --- |
| 379,429 | Werth | Mar. 13, 1888 |
| 1,887,729 | Marvin | Nov. 15, 1932 |
| 2,091,569 | Ridgway et al. | Aug. 31, 1937 |
| 2,110,634 | Rehmann | Mar. 8, 1938 |